United States Patent
Hsieh

(10) Patent No.: US 6,460,360 B2
(45) Date of Patent: Oct. 8, 2002

(54) POWER-GENERATING AND ENERGY-SAVING SYSTEM

(76) Inventor: Sheng-Ming Hsieh, No. 11, Alley 70, Lane 192, Lin-Shen Road, Sec. 2, Tainan (TW)

( * ) Notice: Subject to any disclaimer, the term of this patent is extended or adjusted under 35 U.S.C. 154(b) by 0 days.

(21) Appl. No.: 09/790,054

(22) Filed: Feb. 20, 2001

(65) Prior Publication Data

US 2002/0112850 A1 Aug. 22, 2002

(51) Int. Cl.[7] .............................................. F25B 27/00
(52) U.S. Cl. ................... 62/238.1; 62/238.4; 62/238.6; 62/238.3; 165/201; 60/39.12
(58) Field of Search ......................... 165/201; 62/238.1, 62/238.4, 238.6, 238.3; 60/39.05, 39.12; 423/490; 110/233, 234

(56) References Cited

U.S. PATENT DOCUMENTS

| | | | | |
|---|---|---|---|---|
| 3,247,679 A | * | 4/1966 | Meckler | |
| 4,455,834 A | * | 6/1984 | Earle | 60/659 |
| 4,526,013 A | * | 7/1985 | Joy | 62/238.4 |
| 4,735,061 A | * | 4/1988 | Hsieh | 62/238.1 |
| 5,050,375 A | * | 9/1991 | Dickinson | 60/39.12 X |
| 5,067,330 A | * | 11/1991 | Cook et al. | 62/476 X |
| 5,398,497 A | * | 3/1995 | Suppes | 60/39.05 |
| 5,705,140 A | * | 1/1998 | Johansing, Jr. | 423/490 |

* cited by examiner

Primary Examiner—Ljiljana Ciric

(57) ABSTRACT

An energy-saving system including a primary heat recovery apparatus for recovering heat from the environment of a silencer box having a compressor and a power generator simultaneously coupled with an engine commonly built in the box for warming utility water, a refrigerant heat recovery apparatus for recovering the condensation heat of the refrigerant for warming utility water, a water heat recovery apparatus for recovering the water heat in the water jacket of the engine, and a flue gas heat recovery system having a first gas heat exchanger and a second gas heat exchanger for recovering the waste heat of the exhaust gas. A turbo-generator is driven by a steam turbine driven by the steam produced from the gas heat exchanger for generating electricity. Also at least an absorption-based air conditioner is driven by the waste heat as recovered from the energy-saving system.

1 Claim, 1 Drawing Sheet

POWER-GENERATING AND ENERGY-SAVING SYSTEM

A conventional power generator, engine, compressor or air conditioning system may produce heat during its operation.

It is therefore expected to have an energy-saving system capably recovering the waste heat energy from the air conditioning system, the engine and the power generator for saving energy.

SUMMARY OF THE INVENTION

The object of the present invention is to provide an energy-saving system including a primary heat recovery apparatus recovering heat from the environment of a silencer box having a compressor and a power generator simultaneously coupled with an engine commonly built in the box for warming utility water, a refrigerant heat recovery apparatus recovering the condensation heat of the refrigerant for warming utility water, a water heat recovery apparatus recovering the water heat in the water jacket of the engine, a flue gas heat recovery system having a first gas heat exchanger and a second gas heat exchanger for recovering the waste heat of the exhaust gas, a turbo-generator driven by a steam turbine driven by the steam produced from the gas heat exchanger for generating electricity, and at least one absorption-based air conditioner driven by the waste heat recovered from the energy-saving system.

DETAILED DESCRIPTION

Figure 1:
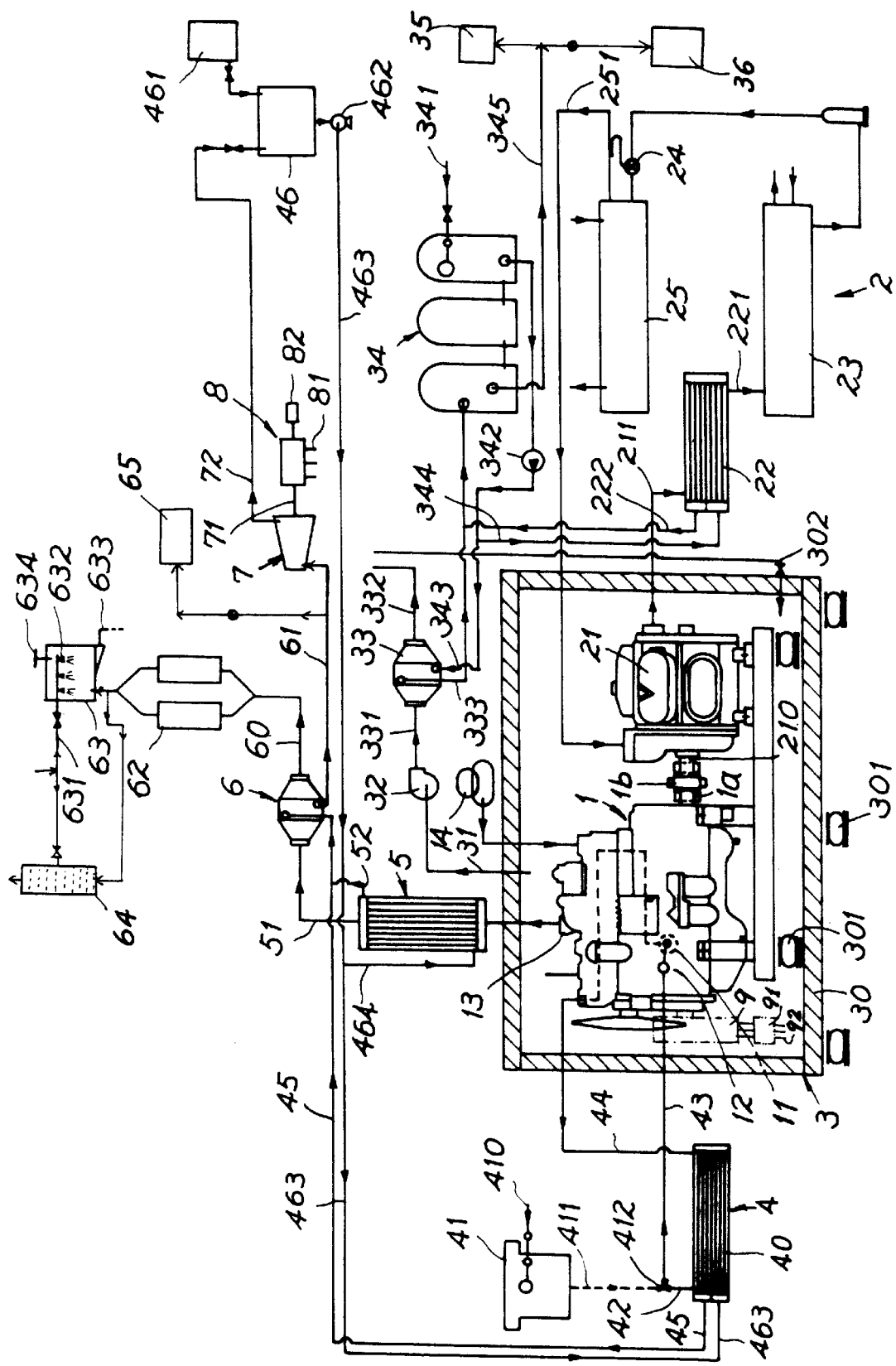
FIG. 1 is an illustration showing the system of the present invention.

As shown in FIG. 1, the present invention comprises: a primary heat recovery apparatus 3 for recovering heat from the environment of a silencer box 30 encasing a compressor 21 of an air conditioning system 2 and a power generator 9 simultaneously coupled to an engine 1, with the engine 1, the compressor 21 and the power generator 9 together built in the box 30; a refrigerant heat recovery apparatus 22 for recovering the condensation heat of the refrigerant of the air conditioning system 2; a water heat recovery apparatus 4 for recovering the heat of the water through the engine water jacket 12; a flue-gas heat recovery system having a first gas heat exchanger 5 and a second gas heat exchanger 6 for recovering the waste heat of the engine exhaust gas, and a turbo-generator 8 driven by a steam turbine 7 which is driven by the steam produced by the second gas exchanger 6.

The primary heat recovery apparatus 3 includes: a silencer box 30 having a casing made of insulating materials (sound and noise insulation) for shielding the noise produced by the compressor 21, the power generator 9 and the engine 1 inside the box 30 and also preventing loss of heat through the box casing; an air suction pipe 31 inserted into the box through an upper hole to direct hot air therefrom; an air entrance pipe 302 directing air into the bottom of box 30; an exhaust fan 32 sucking air outwardly through the pipe 31; an air heat exchanger 33 for recovering heat from the air in the environment within the box 30; and, a hot water storage system 34. The hot water storage system 34 includes a feed water pipe 341 for feeding cold water in to the system 34, a pump 342 for pumping the cold water through a cold water inlet pipe 343 to the shell side of the air heat exchanger 33 for absorbing heat of the air as directed through a hot air inlet pipe 331 to the tube side of the heat exchanger 33 and exhausted through a cold air outlet pipe 332, and a hot water outlet pipe 333 directed from the shell side of the exchanger 33 for leading hot water as heated through the exchanger 33 to the storage system 34 for supplying utility hot water or for preheating boiler feed water through the distribution pipe 345. The hot water as supplied through the pipe 345 is branched into two lines, one for supplying hot water 35 and the other for driving an absorption-based air conditioner 36 for marginally using the waste heat.

The compressor 21 has its main shaft 210 coupled to the driving shaft 1a of the engine 1, which is selected from a diesel engine or a natural-gas fired engine, by a coupling 1b. The compressor 21 and the engine 1 have their base supported on a cushioning device 301 for absorbing vibrational shock during the operation of the present invention for noise prevention.

The air conditioning system 2 is conventional except the heat recovery apparatus 22, which includes: a compressor 21; a refrigerant heat recovery apparatus 22 which is a refrigerant heat exchanger having the compressed refrigerant directed from the compressor 21 to the shell side of the apparatus 22 through a hot refrigerant inlet pipe 211, having a cold water pipe 344 branched from the water pipe 343 for directing cold water into the tube side of the exchanger 22, and having a warm refrigerant outlet pipe 221 for releasing the refrigerant of which the major condensation heat is absorbed by a water stream released from the hot water pipe 222 and directed to the storage system 34; a condenser 23 for further absorbing the condensation heat of the refrigerant released from the exchanger 22; an expansion valve 24 and an evaporator 25 adapted for evaporating the refrigerant liquid to be a refrigerant vapor; and, a return pipe 251 directing the refrigerant vapor from the evaporator 25 to the compressor 21 to be compressed into refrigerant liquid by the compressor 21 for the next operation cycle.

The water heat recovery apparatus 4 includes: a water heat exchanger 40, a compensator of heat-transfer liquid 41, and a cold water reservoir 46. The water heat exchanger 40 includes: a liquid inlet pipe 44 directing a hot liquid which is pumped through the water jacket 12 formed in the engine 1 by a liquid pump 11 into the shell side of the exchanger 40; a first liquid outlet pipe 42 directing the cold liquid through a triple-pass valve 412 and a second pipe 43 to the water jacket 12 of the engine 1 for absorbing the engine heat; a cold water inlet pipe 463 directing the cold water into the tube side of the exchanger 40 to absorb the heat from the liquid as absorbed from the water jacket and engine body; and, a hot water outlet pipe 45 directing the hot water to the shell side of the second gas heat exchanger 6. The compensator of heat-transfer liquid 41 is fed with a heat-transfer fluid selected from water or other liquids through an inlet pipe 410 and has an outlet pipe 411 for making up the liquid into the pipe 43 through the valve 412. The cold water reservoir 46 includes a cold water source 461 for supplying water into the reservoir, and a pump 462 pumping a cold water stream through a pipe 463 to the exchanger 40.

The flue-gas recovery system includes: a first gas heat exchanger 5 having a gas inlet pipe 13 communicating with the exhaust pipe of the engine 1 for directing the hot exhaust gas into the tube side of the first exchanger 5; a gas outlet pipe 51 directing the exhaust gas to the tube side of the second gas heat exchanger 6; a cold water inlet pipe 464 branched from the pipe 463 for directing the cold water into the shell side of the first exchanger 5; a water outlet pipe 52 for directing the hot water into the shell side of the second exchanger 6 to be combined with the hot water as delivered from the water pipe 45 from the water exchanger 40; a second gas heat exchanger 6 having a steam pipe 61 for directing the steam as generated from the shell side of the second exchanger 6 to the steam turbine 7 for driving the turbine 7 and driving the turbo-generator 8, and also having a branch pipe as branched from the steam pipe 61 connected to an absorption-based air conditioner 65 for using the heat from the steam pipe 61; and an exhaust pipe 60 for directing the flue gas through a muffler 62 and a scrubber 63 which is formed with several nozzles 632 for spraying water fed by an inlet pipe 631 for washing or removing the pollutants such as dust or other water-soluble poisonous gases laden in the gas. The pollutants are then drained by a lower valve 633 and the exhaust gas is released from an upper duct 634. Another by-pass flue gas flow is led to a bubbler 64 having water fed into the bubbler 64 through the pipe 631 for bubbling the flue gas within the bubbler 64 in order to absorb $CO_2$ laden in the waste gas in cooperation with the scrubber 63.

The turbo-generator 8 is driven by the steam turbine 7 by coupling the generator shaft to the turbine shaft 71 for generating power 81 to supply electricity for use in a building or a factory. The condensate from turbine 7 is delivered to the reservoir 46 by a condensate pipe 72. A starting motor 82 may be provided to help start the generator 8.

The heat exchangers to be used in this invention are not limited. Tubular heat exchangers and other types of heat exchangers such as double-pipe heat exchangers and spiral plate heat exchangers can be chosen for use with this invention.

The present invention is advantageous compared to conventional air conditioning systems since all kinds of waste heat, such as the heat produced by heat conduction, convection and radiation inside the silencer box 30, the heat produced by the water jacket of the engine body, the refrigerant condensation heat and the the waste heat of the flue gas exhausted from the engine, can be recovered for power generation, for heating the utility water or for preheating boiler feed water for maximal energy-saving purposes.

The power generator 9 as coupled to the engine 1 through the shaft 1a includes an energy-saving controller 91 connected in parallel with an output terminal of the power generator 9 for calculating and regulating a power factor for increasing the power generation efficiency and power generation capacity; the numeral 92 indicates an output terminal for outputting power.

What is claimed is:

1. An energy-saving system comprising:

a primary heat recovery apparatus operatively recovering an environmental heat of of an engine, a compressor of an air conditioning system and a power generator, with said compressor and said power generator simultaneously coupled to said engine;

a refrigerant heat recovery apparatus having a refrigerant heat exchanger connected to said compressor for absorbing the condensation heat from a compressed refrigerant by the compressor and for warming a water stream flowing through said refrigerant heat exchanger;

a water heat recovery apparatus having a water heat exchanger connected to said engine and having a water stream directed in said water heat exchanger for absorbing the heat of water as absorbed from a water jacket in the engine body;

a flue-gas heat recovery system including a first gas heat exchanger communicating with said engine and having a water stream directed in said first gas heat exchanger for absorbing the heat of a flue gas as released from an engine exhaust pipe, and a second gas heat exchanger connected to said first gas heat exchanger and having the water stream directed in said second gas heat exchanger as preheated in the water heat exchanger and the first gas heat exchanger prior to being directed into the second exchanger for further absorption of the heat of the flue gas for generating steam; and a turbo-generator connected to and driven by a steam turbine which is connected to said second gas heat exchanger and driven by the steam produced from the second gas heat exchanger for power generation;

said primary heat recovery apparatus including:

a silencer box having its casing made of sound and thermal insulating materials and encasing the compressor of the air conditioning system directly coupled to an engine, both said compressor and said engine being commonly built in said silencer box; an air entrance pipe directing air into the bottom of the box;

an air suction pipe inserted into said box through an upper hole in the box to direct hot air therefrom;

an exhaust fan connected to said air suction pipe for sucking the hot air through said suction pipe, and an air heat exchanger which is connected with said exhaust fan and has a water stream directed in said air heat exchanger for absorbing the heat of the hot air from said box for producing hot water to be fed into a hot water storage system;

the improvement which comprises:

said primary heat recovery apparatus including a first absorption-based air conditioner connected to said hot water storage system and driven by the heat of the hot water from the air heat exchanger;

said flue-gas heat recovery system including a second absorption-based air conditioner connected to said second gas heat exchanger and driven by the heat of the steam from the second gas heat exchanger;

a bubbler connected to said second gas heat exchanger for bubbling the flue gas as exhausted from the second gas heat exchanger to absorb carbon dioxide gas from the flue gas; and an energy-saving controller connected in parallel with an output terminal of the power generator for calculating and regulating the power factor and for increasing the power generation efficiency of the power generator.

\* \* \* \* \*